United States Patent [19]

Ozawa et al.

[11] 3,963,664

[45] June 15, 1976

[54] METHOD OF PREPARING AROMATIC POLYAMIDE SOLUTIONS

[75] Inventors: Shuji Ozawa; Akihiro Aoki; Hiroshi Fujie, all of Hino, Japan

[73] Assignee: Teijin Limited, Osaka, Japan

[22] Filed: May 12, 1975

[21] Appl. No.: 576,661

Related U.S. Application Data

[63] Continuation-in-part of Ser. No. 452,329, March 18, 1974, abandoned, which is a continuation of Ser. No. 253,802, May 16, 1972, abandoned.

[52] U.S. Cl. .............................................. 260/30.2
[51] Int. Cl.² ........................................... C08K 5/34
[58] Field of Search ...................... 260/30.2 R, 78 R

[56] References Cited
UNITED STATES PATENTS

| | | | |
|---|---|---|---|
| 3,287,324 | 11/1966 | Sweeny | 260/78 R |
| 3,414,645 | 12/1968 | Morgan | 260/78 R |

*Primary Examiner*—Paul R. Michl
*Attorney, Agent, or Firm*—Sherman & Shalloway

[57] ABSTRACT

A method of preparing a homogeneous solution of a polymer whose recurring structural units are predominantly metaphenylene isophthalamide units, comprising:

A. blending at a temperature of from −20°C to 10°C,
  1. a fiber-forming polymer in which at least 90 mol percent of the total recurring structural units are metaphenylene isophthalamide units, and
  2. a solvent consisting of at least 80% by weight N-methyl-2-pyrrolidone, in the substantial absence of inorganic salts and at a polymer concentration of from 15 to 30 percent by weight based on the total weight of the polymer and the solvent, to form a uniform slurry, and B. heating the slurry to a temperature between $T_1$ and $T_2$ but not higher than 130°C, thus forming the solution;

wherein
$$T_1 = -18 + 3C - 1.5X,$$
and
$$T_2 = 330 - 10C + 7X,$$

both $T_1$ and $T_2$ being in degrees centigrade, C being the weight percent of polymer in the blend, and X being the mol percent of recurring structural units other than metaphenylene isophthalamide.

8 Claims, No Drawings

METHOD OF PREPARING AROMATIC POLYAMIDE SOLUTIONS

RELATED APPLICATIONS

This application is a continuation-in-part of U.S. Ser. No. 452,329, filed Mar. 18, 1974 now abandoned, which in turn is a continuation of U.S. Ser. No. 253,802, filed May 16, 1972, now abandoned.

This invention relates to a method of preparing an N-methyl-2-pyrrolidone solution of a fiber-forming polymer, at least 90 mol percent of the recurring structural units of which are metaphenylene isophthalamide units. More particularly, this invention relates to a method of preparing a homogeneous solution from either poly (metaphenylene isophthalamide) or a copolymer, at least 90 mol percent of the recurring structural units are metaphenylene isophthalamide units, and N-methyl-2-pyrrolidone, wherein the homopolymer or copolymer is contained in a high concentration.

For brevity the foregoing homopolymer and copolymer will be generically referred to hereinafter as metaphenylene isophthalamide polymers.

An object of the invention is to provide a stable concentrated solution of the metaphenylene isophthalamide polymer by dissolving the same in N-methyl-2-pyrrolidone. Another object is to provide a concentrated solution of the metaphenylene isophthalamide polymer that can readily form such shaped articles as fibers, films, sheets, coating films and the like. Other objects and advantages of the invention will become apparent from the following description.

The aromatic polyamides, and especially the wholly aromatic polyamides polymerized from the aromatic diamines and aromatic dicarboxylic acids or the functional derivatives thereof, are known to possess such excellent physical and chemical properties as electrical properties, resistance to thermal decomposition, resistance to attack by chemicals, resistance to high energy radiation, inherent non-flammability etc., but while they possess these numerous outstanding characteristics, their solubility in organic solvents is poor. Consequently, various difficulties were experienced in obtaining such shaped articles as fibers, films, sheets and coating films. For instance, while the 6 percent dimethylformamide solution of poly(metaphenylene isophthalamide) is, in its as-obtained state, stable for a while, it immediately becomes turbid and results in the insolubilization of the polymer, when it is allowed to stand or heated. As disclosed in U.S. Pat. No. 3,287,324, the insoluble product formed in this case cannot be redissolved even by heating or dilution. Further, N-methyl-2-pyrrolidone is known to be one of the solvents having the highest solvent power among the amide type solvents. However, it is known that a stable concentrated solution of poly(metaphenylene isophthalamide) cannot be obtained even when this solvent is used, unless it is aided by the incorporation of such salts as lithium chloride and calcium chloride. In practice, for avoiding the risk involved in handling such an instable solution, the shaping operation is carried out, for instance, from a dilute solution of such at a concentration of below 10 percent (by weight) although this practice is very disadvantageous, or, as described in U.S. Pat. No. 3,068,188, British Pat. No. 871,580, by a technique such as adding a small quantity of an inorganic salt. However, the former method can only be employed in the case where a thin film coating is to be formed. Even in this case the economical disadvantageous and technical difficulties involved in removing the large amount of solvent cannot be avoided. While the latter method of adding a salt is usually effective in increasing the stability of the solution, there are such drawbacks as that the salt added remains in the resulting shaped article, and there is the necessity of removing the salt from the shaped article by such operations as washing. In consequence, such complicated operations as contacting the shaped article with water of high temperature for a prolonged period of time become necessary. In addition, such disadvantages as that the thermal decomposition of the shaped article is promoted or that the electrical properties are greatly impaired cannot be avoided when even a trace of these salts remain in the shaped article. Again, attempts to improve the solubility of the polymer itself have been made by such techniques as copolymerization. However, for practical improvement in the solubility, the copolymer must be such that the rate of comonomeric recurring units exceeds 10 mol percent in the copolymer composition. On the other hand, it is known that a copolymer of such a high rate of copolymerization is generally poor in its crystallinity, and that the shaped articles obtained from such copolymer have poor dimensional stability at elevated temperatures. Further, the strength of such shaped articles suffers and they are also susceptible to thermal degradation.

As a result of a close examination of the solubility of the aforesaid metaphenylene isophthalamide polymers, i.e., the poly(metaphenylene isophthalamide) made up wholly of the metaphenylene isophthalamide units of the formula

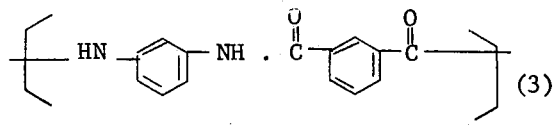

and the copolymers in which at least 90 mol percent of the recurring structural units are the metaphenylene isophthalamide unit of foregoing formula (3), it has been found that by using N-methyl-2-pyrrolidone as the solvent a stable concentrated solution can be prepared without the addition of other inorganic salts. Accordingly it was found that, for example, in the case of a mixture of poly(metaphenylene-isophthalamide) and N-methyl-2-pyrrolidone which was of such a high concentration that the former accounts for more than 10 percent by weight, a critical lower limit of temperature exists at which the polymer dissolves in N-methyl-2-pyrrolidone, which is determined in accordance with the concentration of and the composition of the recurring structural unit in the polymer. At a temperature below this critical temperature a homogeneous and stable solution cannot be obtained. On the other hand, it was also found that a critical upper limit of temperature exists, which is determined by the composition and concentration of the polymer, and that at temperatures exceeding this critical upper limit it was also impossible to obtain a homogeneous and stable solution. Further, it was found that a system such as this could only exist in a homogeneous solution state in a temperature zone defined by the foregoing two critical temperatures. In addition, it was found that the insolubilized product formed at a temperature higher than the critical upper limit temperature cannot be redissolved by such methods as heating or dilution. The generally accepted idea that conventional means such as mixing and/or heating are not sufficient to produce a stable, highly concentrated solution out of the polymer and solvent was found to be erroneous. This is presumably due to the fact that the presence of the temperature zone mentioned above was overlooked during the process of dissolution.

Thus, according to the present invention (I) the polymer of metaphenylene isophthalamide can be dissolved in N-methyl-2-pyrrolidone homogeneously and at a high concentration by heating the polymer and solvent consisting of at least 80 percent by weight of N-methyl-2-pyrrolidone at a temperature not below the temperature ($T_1$) determined by the following relationship (1)

$$T_1 = -18 + 3C - 1.5x \ldots \quad (1)$$

and moreover at a temperature not exceeding the temperature ($T_2$) determined by the following relationship (2)

$$T_2 = 330 - 10C + 7x \ldots \quad (2)$$

wherein $T_1$ and $T_2$ are temperature (°C.), C is the weight percent of the aforesaid polymer contained in the mixed system of polymer and solvent, and x is the mol percent of the recurring structural units other than the metaphenylene-isophthalamide units contained in the polymer.

According to the invention (II) the aforesaid metaphenylene isophthalamide polymer can also be dissolved homogeneously and at a high concentration in N-methyl-2-pyrrolidone by a procedure consisting of mixing the foregoing polymer and a solvent consisting of at least 80 percent by weight of the foregoing solvent at a temperature from 10° to −20°C.

It is also critical in the present invention that the polymer is first blended in a solvent consisting of at least 80 percent by weight of N-methyl-2-pyrrolidone at a temperature between −20°C and 10°C so as to form a uniform slurry and then heating the slurry to a temperature between $T_1$ and $T_2$, but not higher than 130°C. otherwise a highly concentrated solution which is uniform, transparent and stable over a long period of time cannot be obtained.

THE POLYMER

As already noted hereinbefore, poly(metaphenylene-isophthalamide), the homopolymer made up wholly of metaphenylene isophthalamide units, is used in this invention as the solute polymer, if it is fiber forming.

Further, those copolymers made up of the metaphenylene isophthalamide units of the hereinbefore given formula (3) and other recurring structural units, in which the former account for at least 90 mol percent of the total recurring structural units can also be used in this invention. For brevity, when reference is being made to such copolymers, only, they will be referred to as metaphenylene isophthalamide copolymers hereinafter. Any of these copolymers may also be used as in the case with the foregoing homopolymer, as long as they are fiber forming.

In general, as these homopolymer and copolymers, those having an inherent viscosity, as hereinafter defined, of 0.6 − 3.0, and preferably 0.9 − 2.5, are conveniently used.

As the copolymeric units (or copolymeric components) other than the metaphenylene isophthalamide, which make up the copolymer, typical are, for example, metaphenylene terephthalamide, paraphenylene isophthalamide, and paraphenylene terephthalamide. However, as long as the copolymeric unit or component is one capable of forming a fiber-forming metaphenylene isophthalamide copolymer by copolycondensing with metaphenylene isophthalamide, any will do.

Therefore, these copolymeric units (or copolymeric components) may be an aromatic amide unit derived from a benzene dicarboxylic acid and a phenylene diamine such as the aforesaid metaphenylene terephthalamide, paraphenylene isophthalamide and paraphenylene terephthalamide; or a meta- or para-benzamide unit; or an amide unit containing a benzene ring such as 2,6-naphthylene, 4,4'-biphenylene and 4,4'-oxodiphenylene; and also the alkylene amide unit. Further, these copolymeric units or components may be those having a structure in which the hydrogen on the benzene ring or the hydrogen on the amide nitrogen atom is substituted by, for example, halogen, nitro, sulphone, alkoxy, carboxyl groups or functional derivatives thereof (e.g. alkoxycarbonyl or substituted alkoxycarbonyl group), lower alkyl and secondary amino groups. Similarly, the aforesaid copolymeric unit may be one having a structure in which one or more of the hydrogen atoms on one or more of the benzene rings or the amide groups of the metaphenylene isophthalamide unit is substituted by a substituent such as those mentioned above.

These copolymeric units (or copolymeric components) can be introduced into the metaphenylene isophthalamide unit within such limits as will not impair the desirable properties that are possessed by poly(-metaphenylene isophthalamide), such as its resistance to high temperatures, crystallinity, whiteness, self-distinguishing character, resistance to solvents, resistance to attack by chemicals and resistance to radioactive radiation. When resistance to high temperatures and resistance to solvents are especially desired, a smaller proportion of the copolymeric unit is to be preferred. These metaphenylene isophthalamide polymers (including the homopolymers) may be those which have been prepared by such known methods as the low temperature solution polycondensation method (U.S. Pat. No. 3,063,966), the interfacial polycondensation method (U.S. Pat. No. 3,006,899) or the oligomer method (U.S. Pat. No. 3,640,970, Brit. Pat. No. 1,265,732), or any other method. Further, the foregoing polymer to be used as the solute in this invention may contain a small amount of water, especially water of the order of adsorbed moisture.

Further, the copolymeric unit (or copolymeric component) in the metaphenylene isophthalamide copolymer to be used as the solute in this invention may be those incorporated by a chain extending linkage other than amide, for example, ester, imide, benzimidazole, benzoxazole, and oxadiazole as long as it does not impair the aforesaid excellent properties that are possessed by poly(metaphenylene isophthalamide).

Again, the metaphenylene isophthalamide polymer, including the aforesaid homopolymer and copolymers, that are used in the invention can be admixed with a small amount of one or more of the foregoing copolymers or a polymer composed of one or more of the aforementioned copolymeric components or other compatible polymers. In this case, the amount of the component to be admixed is preferably not greater than 10 percent by weight. And in this case also, the amount added should preferably be one which does not greatly impair the desirable properties possessed by poly(metaphenylene isophthalamide).

SOLVENT

While N-methyl-2-pyrrolidone is used as the solvent in this invention, a part thereof may be replaced by other solvents, e.g., an amide type solvent or dimethyl sulfoxide, etc. The amide type solvents that are preferable for this purpose include, such, for example, as N,N-dimethylformamide, N,N-dimethyl acetamide, N,N,N',N'-tetramethylurea, N-methylcaprolactam and N,N,N',N',N'',N''-hexamethylphosphoramide. In most cases, a substitution on a weight basis of not more than 30 percent, and especially not more than 20 percent, does not cause a serious impairment of the stability of the solution of the aforesaid metaphenylene isophthalamide polymer. Further, a part of the N-methyl-2-pyrrolidone can also be replaced by a small amount of a diluent. For this purpose, such compounds as, for example, acetone, methyl ethyl ketone, cyclohexanone, tetramethylenesulfone, and tetrahydrofuran can be used. In this case, also, from the standpoint of maintaining the stability of the solution of the metaphenylene isophthalamide polymer, these compounds are used in an amount not exceeding 10 percent, and especially not exceeding 5 percent.

Thus, a solvent consisting of at least 90 percent by weight, especially 95 percent by weight, of N-methyl-2-pyrrolidone is used with advantage in the present invention. Those solvents which have been purified by distillation in customary manner are fully satisfactory for the present purpose.

THE DISSOLVING METHOD AND CONDITIONS

According to the invention, the hereinbefore described metaphenylene isophthalamide polymer and the solvent containing at least 80 percent by weight of N-methyl-2-pyrrolidone can be formed into a homogeneous polymeric solution by mixing the foregoing components with stirring at a temperature that falls within the range of not lower than the temperature ($T_1$) determined by the foregoing relationship (1) and not higher than the temperature ($T_2$) determined by the foregoing relationship (2) and moreover not exceeding a higher limit of 150°C. However, a more favorable method according to this invention consists in first blending the polymer and the solvent until no coarse polymer particles are present and a slurry of maximum uniformity is obtained, following which this slurry is heated at a temperature within the hereinafter specified range. In this latter dissolving method, it happens at times that the dissolving action proceeds locally to render it impossible to carry out the blending uniformly. Therefore, the kneading is usually best carried out at a temperature lower than the aforesaid temperature ($T_1$) of the relationship (1) but higher than $-20°C$ to form a uniform slurry.

No matter which of the foregoing methods is employed, it is preferred in this invention that the proportion in which the metaphenylene isophthalamide polymer and the solvent predominantly of N-methyl-2-pyrrolidone are mixed is in a range of percentage wherein the aforesaid polymer does not exceed 35 percent, and especially 30 percent, and wherein the weight of the aforesaid polymer is at least 10 percent, and especially at least 15 percent. While, in a strict sense, the limit of concentration on a weight basis of the polymer varies depending upon such as the detailed structure of the polymer, the rate of copolymerization, the ratio of mixture with other polymers, the use of solvents and diluents other than N-methyl-2-pyrrolidone, etc., in general, it is preferred that the polymer content does not exceed 35 percent by weight, and especially 30 percent by weight.

In the case of the latter dissolving method, a major portion of air bubbles formed during the blending operation can be easily removed from the resulting slurry simply by applying reduced pressure at a temperature lower than the temperature ($T_1$) indicated by the aforesaid relationship (1). Then when the slurry is heated in situ at the temperature ($T_1$) indicated by the aforesaid relationship (1), or a higher temperature, dissolution immediately starts and the dissolution is usually completed in about 10 minutes to about one hour, depending upon the kneading conditions and the dissolution temperature.

When the so obtained solution is then gently stirred under reduced pressure, e.g., of about 100 – 200 mm of mercury, the air contained in the solution can be removed and, at the same time, the solution is conditioned and made suitable for feeding immediately to such molding steps as spinning and film forming. If the temperature at the time of this dissolving is too high, such shortcomings as loss of the solvent at the time of deaeration, thermal degradation of the solvent, nonuniformity of heating, as well as insolubilization of the polymer tend to occur. Therefore, a temperature below 150°C., especially below 130°C., and moreover a temperature not higher than the temperature ($T_2$) indicated by the aforesaid relationship (2) is usually preferred.

The solution of the metaphenylene isophthalamide polymer obtained in this manner must now be stored in, for example, a storage tank for the solution for a prolonged period of time before it is submitted to such processing steps as spinning, film forming and forming of film coating. In this case, the solution is preferably held at a temperature not lower than the temperature ($T_1$) indicated by the aforesaid relationship (1) and not higher than the temperature ($T_2$) indicated by the aforesaid relationship (2) and moreover below 150°C., especially below 130°C. If the solution is held at a temperature lower than the temperature ($T_1$) indicated by the relationship (1), the polymer gradually precipitates out, and the fluidity and homogeneity of the system become lost. This precipitated polymer is characterized in that it can be redissolved by heating. On the other hand, if the solution temperature exceeds the temperature ($T_2$) indicated by the relationship (2), the system, although locally, becomes turbid and with the passage of a prolonged period of time loses its fluidity and homogeniety, and precipitates, at times, a coarse, crystalline insoluble product is characterized in that it no longer can be redissolved by such operations as reheating or the addition of an excessive amount of a solvent.

Therefore, the temperature employed in preparing the solution from the aforesaid metaphenylene isophthalamide polymer, the solute, and the aforesaid solvent predominantly of N-methyl-2-pyrrolidone and the temperature at which the resulting solution is to be held should preferably be one which is not lower than the temperature ($T_1$) indicated by the relationship (1) and sufficiently lower than the temperature ($T_2$) indicated by the relationship (2) and moreover does not exceed the upper limit of 150°C., and preferably 130°C. It was found that as a result of the fact that the polymeric solution obtained by the invention method is held within the aforementioned temperature zone, the solution could be stably stored for at least 24 hours or more and in most cases more than several days with no need at all for the addition of an inorganic salt. In addition, it was found that as long as the solution is held within this temperature zone no difficulties are experienced even during transfer movement of the solution through a pipe by means of pumps.

The following examples are given for more fully illustrating the method of this invention.

The inherent viscosity of the metaphenylene isophthalamide polymer, as indicated hereinafter, is a value obtained by measurement at 30°C. of a solution of 0.5 gram of the polymer in 100 ml of 95 percent sulfuric acid. The parts in the example are on a weight basis.

EXAMPLE 1

Twenty-five grams of poly(m-phenylene isophthalamide) of an inherent viscosity of 1.5 were ground to 100-mesh size, after which this polymer was added to 100 grams of N-methyl-2 -pyrrolidone cooled in advance to 10°C. After this mixture was vigorously stirred, it was then deaerated by allowing it to stand for 30 minutes under reduced pressure at 100 mm Hg while holding its temperature at below 10°C. The mixture was then heated at 60°C., and as a result a homogeneous solution of good transparency and containing no bubbles was obtained in several minutes. This solution could be stored with no change for a long period of time as long as it was held at 60°C. (Under the above conditions the temperature $T_1$ given by equation (1) is 42°C., and the temperature $T_2$ given by equation (2) is 130°C.)

EXAMPLE 2

350 Grams of m-phenylene isophthalamide-terephthalamide copolymer (inherent viscosity 1.6) containing 8 percent of the m-phenylene terephthalamide component were pulverized to a particle size of 150 mesh, after which this mixture was added to 1000 grams of N-methyl-2-pyrrolidone cooled in advance to 0°C. This mixture was vigorously stirred for 5 minutes. The so obtained slurry was then deaerated by allowing it to stand for 30 minutes under reduced pressure of 100 mm Hg while cooling it at 0°C. The slurry was then heated at 100°C. to obtain in 10 minutes a homogeneous solution of good transparency, which is entirely free from bubbles. This solution was stable for a prolonged period of time (over 24 hours) at 100°C. (In this case $T_1$ is 48°C., and $T_2$ is 126°C.)

EXAMPLE 3

300 Grams of a m-phenylene isophthalamide copolymer (inherent viscosity 1.3) copolymerized by substituting trimellitic anhydride monochloride for 5 mol percent of the acid chloride component were ground to a particle size of 100 mesh and added to 1000 grams of N-methyl-2-pyrrolidone at 0°C., the resulting mixtures being vigorously stirred while maintaining its temperature at 0°C. Thereafter, the mixture, while being held in its cooled state, was deaerated by allowing it to stand for 30 minutes under reduced pressure of 100 mm Hg. (The mixture keeps a slurry state stable for a long period of time at below 0°C.) When this mixture was heated at 70°C., it became a homogeneous, transparent solution in 10 minutes. This solution was stable for a long period of time (more than 24 hours) at 80°C. ($T_1$ 43.5°C., $T_2$135°C.)

EXAMPLE 4

Twenty-five grams of poly(m-phenylene isophthalamide) having an inherent viscosity of 1.5 were added to 100 grams of N-methyl-2-pyrrolidone cooled in advance to 10°C., after which the resulting mixture was thoroughly triturated at temperature of 10° to 15°C. The mixture was then heated at 90°C. and deaerated by being allowed to stand for 30 minutes under reduced pressure of 100 mm Hg. The so obtained solution was stable for a prolonged period of time at 50° – 130°C. ($T_1$ 42°C., $T_2$130 °C.)

CONTROL 1

Twenty-five grams of poly(m-phenylene isophthalamide) of inherent viscosity of 1.5 were added to 100 grams of N-methyl-2-pyrrolidone and dissolved by heating in a 170°C. bath. When the temperature of the mixture reached 150°C., turbidity resulting from the formation of a gel-like matter was noted. When the temperature of the mixture reached 170°C., a translucent gel was obtained. Even though this product was cooled to 60°C., it remained in its translucent gel state.

EXAMPLE 5

316 Grams of m-phenylene isophthalamide-terephthalamide copolymer (inherent viscosity 2.0) containing 3 percent of the m-phenylene terephthalamide component were pulverized to a particle size of 100 mesh and added to 1000 grams of N-methyl-2-pyrrolidone cooled in advance to 5°C., the resulting mixture being vigorously stirred. While maintaining the temperature of this mixture at below 10°C., it was deaerated by being allowed to stand for 30 minutes under reduced pressure of 100 mm Hg. This mixture was heated at 70°C. to obtain 10 minutes later a homogeneous solution of good transparency and containing no air bubbles. This solution could be stored stably for a prolonged period of time by holding it at 70°C. ($T_1$49.5°C., $T_2$111°C.)

CONTROL 2

When 20 grams of the solution obtained in Example 7 were taken, heated at 110°C. and maintained at this temperature, the solution became turbid in 2 – 3 hours, and 24 hours later a translucent gel-like product of small fluidity was obtained. This product was cooled to 70°C. and observed over a long period of time, but it remained in its gel-like state.

EXAMPLE 6

Fifteen grams of N,N-dimethylformamide and 85 grams of N-methyl-2-pyrrolidone were mixed and cooled to 0°C. 39 grams of a m-phenylene isophthalamide copolymer (inherent viscosity 1.9) copolymerized by substituting 2,4-diamino-toluene for 5 mol percent of the diamine component were added to the foregoing solvent mixture, followed by stirring the resulting mixture vigorously for 5 minutes. The deaeration of this mixture was carried out by allowing it to stand for 30 minutes under reduced pressure of 100 mm Hg while holding the temperature of the mixture at below 10°C. On heating this mixture at 60°C., a homogeneous solution of good transparency and containing no bubbles was obtained in several minutes. This solution could be stored stably for a long period of time when held at 60°C. ($T_1$58.5°C., $T_2$85°C.)

EXAMPLE 7

When the homogeneous, transparent solution obtained in Example 8 was held at 20°C., it became turbid 24 hours later and its gelatin progressed. When the so formed gel-like product was heated at 60°C., a homogeneous, transparent solution was again obtained. ($T_1$49.5°C., $T_2$111°C.)

EXAMPLE 8

Twenty-five grams of m-phenylene isophthalamide-terephthalamide copolymer (inherent viscosity 1.9) containing 3 percent of the m-phenylene terephthalamide component were ground and sifted to a particle size of 100 mesh pass and added to 100 grams of N-methyl-2-pyrrolidone containing 10 percent of tereanhydrofuran and cooled in advance to 10°C. After this mixture was vigorously stirred, it was heated at 60°C., to yield after several minutes a homogeneous solution having good transparency. This solution could be stored stably for a long period of time at 100°C. ($T_1$ 37.5°C., $T_2$ 151°C.)

EXAMPLE 9

A powder of poly(m-phenylene isophthalamide) (inherent viscosity 1.6) was added to N-methyl-2-pyrrolidone cooled to −10°C. After vigorous stirring, the mixture was heated to various temperatures. The behaviors at these temperatures are shown in the following table.

| Concentration % | $T_1$ °C. | $T_2$ °C | Temperature (°C.) | | |
|---|---|---|---|---|---|
| | | | 0 | 20 | 60 |
| 5 | −3 | 280 | 0 | 0 | 0 |
| 8 | 6 | 250 | X | 0 | 0 |
| 17 | 33 | 160 | X | X | 0 |

In the above table, the symbol O denotes that a stable, homogeneous, transparent solution was obtained, whereas the symbol X denotes that a translucent gel-like matter was noted in the solution. $T_1$ and $T_2$ are the temperature limit (°C.) given by equations (1) and (2) respectively.

When the above 17 percent polymeric solution was extruded from a nozzle 0.1 mm in diameter into a 40 percent aqueous $CaCl_2$ solution and the freshly spun filament was water-washed, drawn and heat treated, a lustrous yarn having a tenacity of 4.8 grams per denier, an elongation of 28 percent and good clarity was obtained.

On the other hand, in the case of the 5 percent polymeric solution, the initial windup was not possible, and in the case of the 8 % polymeric solution, only an opaque white yarn having a tenacity of 1.8 grams per denier and an elongation of 15 percent could be obtained by means of the same spinning procedure.

Many equivalent modifications will become apparent to those skilled in the art from a reading of the above without a departure from the inventive concept.

We claim:

1. A method of preparing a homogeneous solution of a polymer whose recurring structural units are predominantly metaphenylene isophthalamide units, comprising:

A. blending at a temperature of from −20°C to 10°C,
        1. a fiber-forming polymer in which at least 90 mol percent of the total recurring structural units are metaphenylene isophthalamide units, and
        2. a solvent consisting of at least 80% by weight of N-methyl-2-pyrrolidone, in the substantial absence of inorganic salts and at a polymer concentration of from 15 to 30 percent by weight based on the total weight of the polymer and the solvent, to form a uniform slurry, and B. heating the slurry to a temperature between not below the temperature $T_1$ and not exceeding the temperature $T_2$ but not higher than 130°C, thus forming the solution;

wherein
$$T_1 = -18 + 3C - 1.5X,$$
and
$$T_2 = 330 - 10C + 7X,$$

both $T_1$ and $T_2$ being in degrees centigrade, C being the weight percent of polymer in the blend, and X being the mol percent of recurring structural units other than metaphenylene isophthalamide.

2. The method of claim 1 wherein the fiber-forming polymer consists essentially of poly(metaphenylene isophthalamide).

3. The method of claim 1 wherein the fiber-forming polymer has an inherent viscosity of 0.6 to 3.0 as measured by 0.5g of polymer in 100 ml of 95 percent sulfuric acid at 30°C.

4. The method of claim 1 wherein the fiber-forming polymer recurring units other than metaphenylene isophthalamide are selected from at least one of the group consisting of: metaphenylene terephthalamide, paraphenylene isophthalamide, and paraphenylene terephthalamide.

5. The method of claim 1 wherein the solvent is at least 90 percent by weight of N-methyl-2-pyrrolidone.

6. The method of claim 1 wherein the solvent is at least 95 percent by weight of N-methyl-2-pyrrolidone.

7. The method of claim 1 wherein the homogeneous solution is stored before it is submitted to processing steps for a period of at least 24 hours at a temperature between $T_1$ and $T_2$ but not exceeding 130°C.

8. The method of claim 1 wherein the solvent is 100 percent N-methyl-2-pyrrolidone.

* * * * *